Aug. 7, 1945.   C. F. OVERLY   2,381,770
ROTARY SHAFT COUPLING
Original Filed May 20, 1942
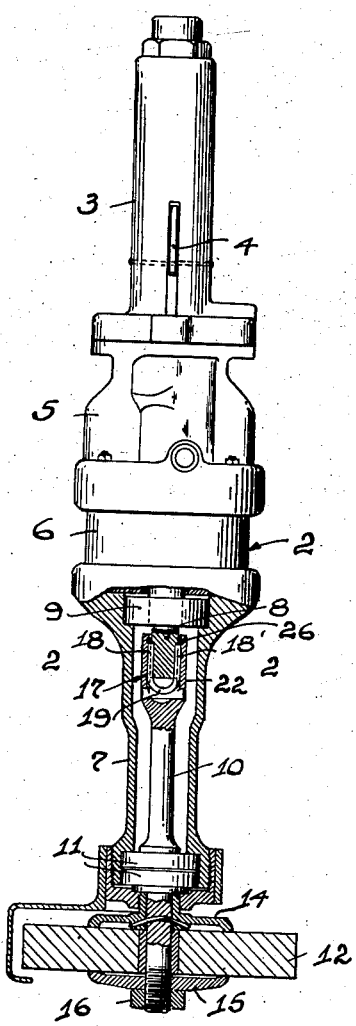
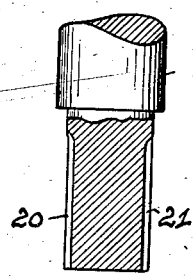
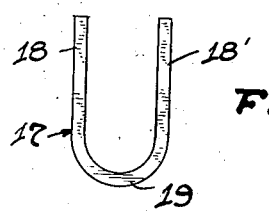
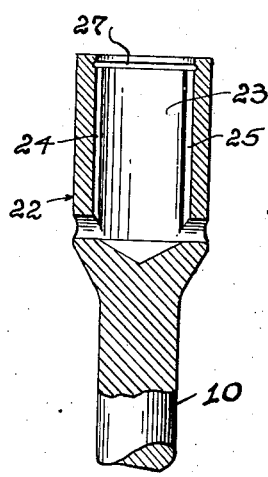
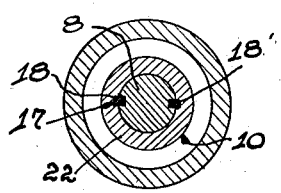
INVENTOR.
CHARLES F. OVERLY
BY *Gustav A. Hoff*
ATT.

Patented Aug. 7, 1945

2,381,770

UNITED STATES PATENT OFFICE 2,381,770

ROTARY SHAFT COUPLING

Charles F. Overly, East Cleveland, Ohio

Original application May 20, 1942, Serial No. 443,743. Divided and this application November 10, 1943, Serial No. 509,953

4 Claims. (Cl. 64—23)

This invention relates to rotary shaft couplings and is a divisional application of my co-pending application, Ser. No. 443,743, for "Rotary power tool," filed May 20, 1942, now Patent No. 2,375,-490, issued May 8, 1945.

The general object of this invention is the provision of a practical and economic rotary shaft coupling of a shaft and mating member sleeved together and keyed to each other so that the shaft and mating member fit together without looseness and with perfect freedom.

A particular field of use for this type of coupling, although the invention is not restricted to such a field, is the coupling of shafts in small tools and small power tools in which the coupled shafts must run quietly and smoothly without backlash between engaging parts without wear at the contacting surfaces and without deformation of the engaging parts.

This general object of the invention is attained by coupling a shaft and mating member by means of a U-shaped key member dimensioned to fit oppositely arranged key slots in the outer peripheral wall of the shaft and the inner peripheral wall of the mating member so that the web portion of the U-shaped key extends diametrically over the end face of the shaft.

Another object of the invention is the provision of a coupling for rotary shafts in which a shaft and mating member sleeved upon said shaft each are formed with diametrically opposed key ways and keyed together by a U-shaped key member, the leg portions of which are inserted in the opposed key ways of said shaft and mating member, and the web portion of which is extended into said mating member in diametrical relation with respect to said shaft and mating member.

A further object of the invention is the provision of a coupling for rotary shafts in which a shaft and a mating sleeve member each are formed with diametrically opposed key ways, with the mating sleeve member mounting in its key ways a U-shaped key member arranged therein so that the open end of said key member extends toward the end of said sleeve member and in which means are provided to secure the key member in the sleeve member to effect a slidable, readily releasable and backlash free key coupling between the shaft and sleeve member without removal of any key means.

In addition, the invention has other marked superiorities which radically distinguish it from presently known structures. These improvements embodying certain novel features of construction are more clearly set forth in the following specification and the appended claims, and a preferred embodiment of the invention is hereinafter shown with reference to the accompanying drawing forming part of the specification.

In the drawing:

Fig. 1 is a longitudinal sectional view, partly in elevation, through a rotary power tool showing a rotary shaft coupling built in accordance with the invention between the rotor shaft and the tool drive shaft;

Fig. 2 is a cross-sectional view through the rotary shaft coupling shown in Fig. 1, the section being taken on line 2—2 of Fig. 1;

Figs. 3 through 6 show the elements of the rotary shaft coupling, thus

Fig. 3 is a fragmentary sectional view of the rotor shaft, partly in elevation, showing the arrangement of the key ways in said shaft;

Fig. 4 is a side-view of the split ring holding the key member in the sleeve-like end of the drive shaft;

Fig. 5 is a plan view of the U-shaped key member, and

Fig. 6 is a fragmentary sectional view of the drive shaft, partly in elevation, showing the arrangement of the keyways in the sleeve-like end of said drive shaft.

Referring now more particularly to the exemplified form of the invention shown in the drawing, reference numeral 2 represents a rotary power tool similar in construction to the power tool shown in the parent application above referred to. This power tool embodies a handle member 3 having a control trigger 4, a central head 5, a cylinder section 6 and a front head 7, and carries in its cylinder section a rotor, the shaft 8 of which is mounted in a ball bearing 9 at the upper end of front head 7 and coupled with a drive shaft 10 rotatably mounted in front head 7 by means of ball bearings 11. Drive shaft 10 supports at its lower end a grinding wheel 12 secured thereto, as customary, by inner and outer wheel washers 14 and 15 forced toward each other by a nut member 16.

The coupling between the lower end of rotor shaft 8 and the upper end of drive shaft 10 is effected by a U-shaped key member 17 embodying two leg portions 18, 18' and a half-circular web portion 19 and cooperating with said shafts in slidably securing same to each other. For such purpose the rotor shaft 8 has in its lower end two outer key ways 20, 21 diametrically arranged with respect to each other and parallelly arranged with respect to the axis of shaft 8, and drive shaft 10 has its upper end enlarged to a head 22 formed with a central bore 23 and two inner key ways 24, 25 diametrically arranged with respect to each other and parallelly arranged with respect to the axis of drive shaft 10. The U-shaped key member 17 engages the key ways 20, 21 of shaft 8 and the key ways 24, 25 in shaft 10 and thus secures these shafts together without backlash and is invertedly extended into the bore of head 22 so that web portion 19 of said key member extends diametrically opposite the front face of shaft 8 and permits proper adjustment of the two shafts with respect to each other.

Key member 17 is held in key ways 24, 25 of head 22 by means of a spring split ring 26 engaging a circular groove 27 in bore 23 and preventing axial movement of said key member in said bore. This arrangement simplifies coupling proceedings, as the end of shaft 8 when rotated to align its key ways with key member 17 can readily and easily be extended into head 22 and effect the desired coupling between the two shafts without actuation of the key member.

Having thus described my invention, what I claim is:

1. In a rotary shaft coupling a shaft having diametrically opposed key ways arranged lengthwise thereof, a mating sleeve sleeved upon said shaft and having diametrically opposed key ways arranged lengthwise of said sleeve in the inner wall thereof, and a U-shaped key member within said sleeve having its leg portions partly extended into the key ways of said shaft and partly extended into the key ways of said mating sleeve for coupling said shaft to said mating sleeve, said key member having its web portion intersecting the axes of said shaft and mating sleeve.

2. In a rotary shaft coupling a shaft having diametrically opposed key ways arranged lengthwise thereof, a mating sleeve sleeved upon said shaft and having diametrically opposed key ways arranged lengthwise of said sleeve in the inner wall thereof, a U-shaped key member coupling said shaft to said mating sleeve, and means securing said key member in said sleeve member, said key member having its leg portions partly arranged in said key slots and partly extended therefrom for coupling engagement with said shaft, and said key member having its web portion intersecting the axes of said shaft and mating sleeve.

3. In a rotary shaft coupling a shaft having diametrically opposed key ways arranged lengthwise thereof, a second shaft having an enlarged head, a bore in said head fitting said first shaft, diametrically opposed key ways in the wall of said bore, a U-shaped key member in said bore having its leg portions extended into the key ways of said bore and shaft to couple said shafts without backlash and having its web portion intersecting the axis of said bore opposite the end of said shaft to permit axial adjustments of said shafts, and means to lock said U-shaped key member in said bore without interfering with axial adjustment of said shafts with respect to each other.

4. A rotary shaft coupling as described in claim 3, wherein the means locking the U-shaped key member consists of a split ring seated in a circular recess in the wall of said bore near the end of said head.

CHARLES F. OVERLY.